United States Patent [19]

Shuert

[11] Patent Number: 4,936,451
[45] Date of Patent: Jun. 26, 1990

[54] CONTAINER WITH SLEEVE INTERLOCKING LATCH

[76] Inventor: Lyle H. Shuert, 1034 Stratford Pl., Bloomfield Hills, Mich. 48013

[21] Appl. No.: 219,042

[22] Filed: Jul. 14, 1988

Related U.S. Application Data

[63] Continuation-in-part of Ser. No. 80,230, Jul. 28, 1987, Pat. No. 4,765,252, which is a continuation of Ser. No. 858,524, Apr. 23, 1986, abandoned, which is a continuation of Ser. No. 642,778, Aug. 21, 1984, abandoned.

[51] Int. Cl.$^5$ ............................................. B65D 19/06
[52] U.S. Cl. .................................. 206/386; 108/55.1; 206/598; 206/600; 220/74
[58] Field of Search .................. 220/73, 74, 4 F, 1.5; 229/104; 206/386, 598, 599, 600; 108/55.1, 56.1, 56.3, 901

[56] References Cited

U.S. PATENT DOCUMENTS

| | | | |
|---|---|---|---|
| 2,555,926 | 6/1951 | Hendrick | 220/73 |
| 2,893,588 | 7/1959 | Martin | 220/4 F |
| 3,568,912 | 3/1971 | Simas | 206/598 X |
| 3,664,570 | 5/1972 | Kupersmit | 108/55.1 X |
| 3,797,691 | 3/1979 | Williams, Jr. | 220/1.5 |
| 3,797,727 | 3/1974 | Downing et al. | 108/55.1 X |
| 3,989,157 | 11/1976 | Veenera | 220/4 F |
| 4,030,600 | 6/1977 | Heaps | 206/386 |
| 4,239,149 | 12/1980 | Kupersmit | 206/600 V |
| 4,531,670 | 7/1985 | Kupersmit | 220/4 F X |
| 4,765,252 | 8/1988 | Shuert | 108/55.1 |

FOREIGN PATENT DOCUMENTS 2085545  4/1982  United Kingdom ............... 206/598

OTHER PUBLICATIONS

Three (3) photographs of a plastic protector device previously utilized by Shuert/Tri-Wall.

*Primary Examiner*—Bryon P. Gehman
*Attorney, Agent, or Firm*—Krass and Young

[57] ABSTRACT

A plastic reinforcing structure for use with a container of the type including a corrugated sleeve adapted to be removably attached to a plastic pallet or base member by the use of sliding latch members coacting with slots in the lower peripheral portion of the sleeve. The reinforcing structure is formed as a single piece of plastic material and includes an inner planar portion, an outer planar portion, a central wall portion, and inner and outer tubular portions carrying lips on their leading edges. In use, the central wall of the reinforcing structure is positioned under and along the lower edge of the sleeve beneath a slot in the sleeve and the inner and outer planar portions are swung upwardly about live hinges provided between the bottom wall and the inner and outer planar portions. As the inner and outer portions are swung upwardly and inwardly, the tubular portions enter the slot from the inner and outer faces of the sleeve and the lips on the tubular portions lockingly coact to positively secure the reinforcing structure to the sleeve with the tubular portions providing a liner for the slot in the sleeve and the planar portions positioned against protecting the outer and inner faces of the sleeve surrounding the slot.

27 Claims, 3 Drawing Sheets

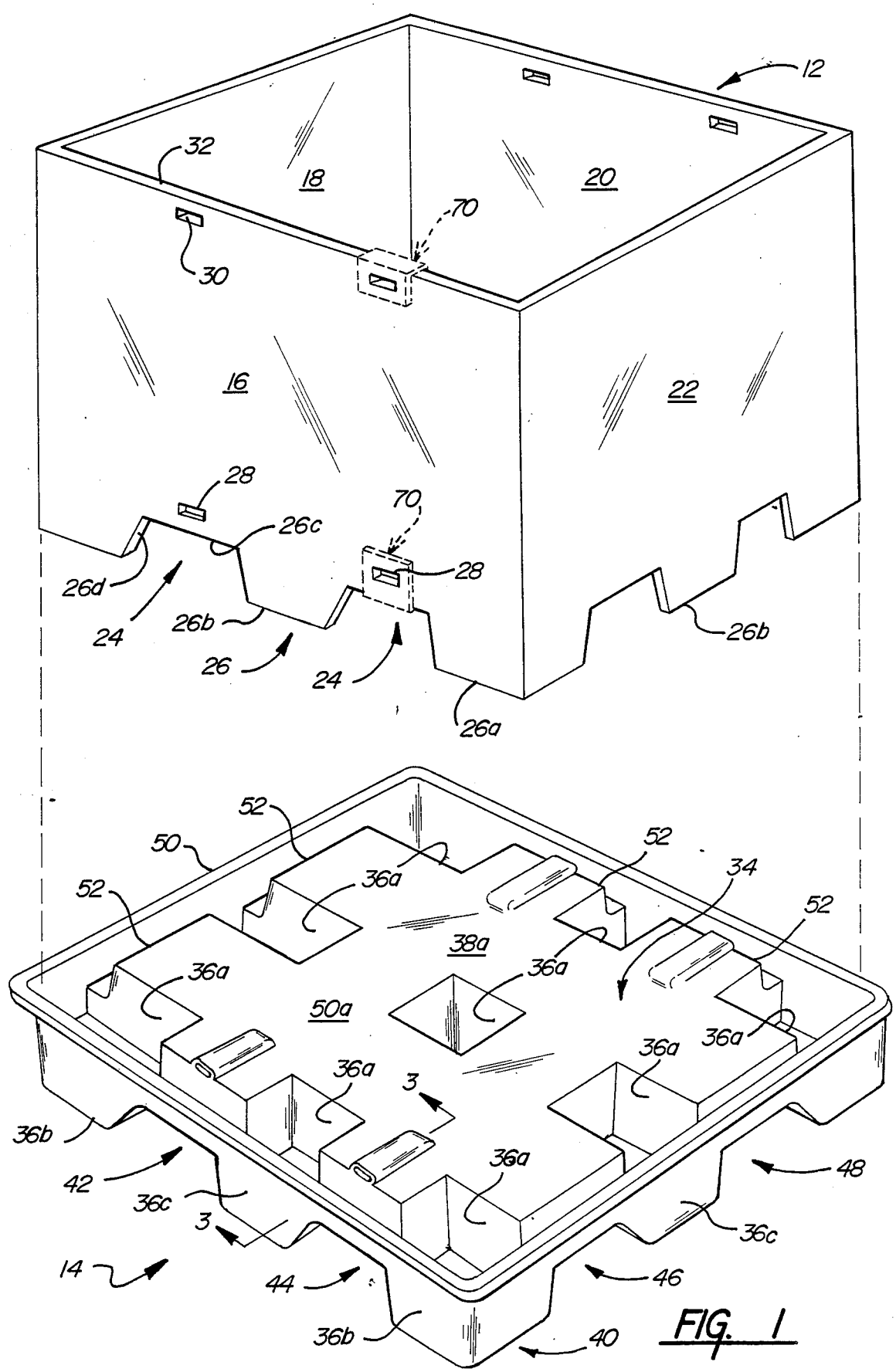

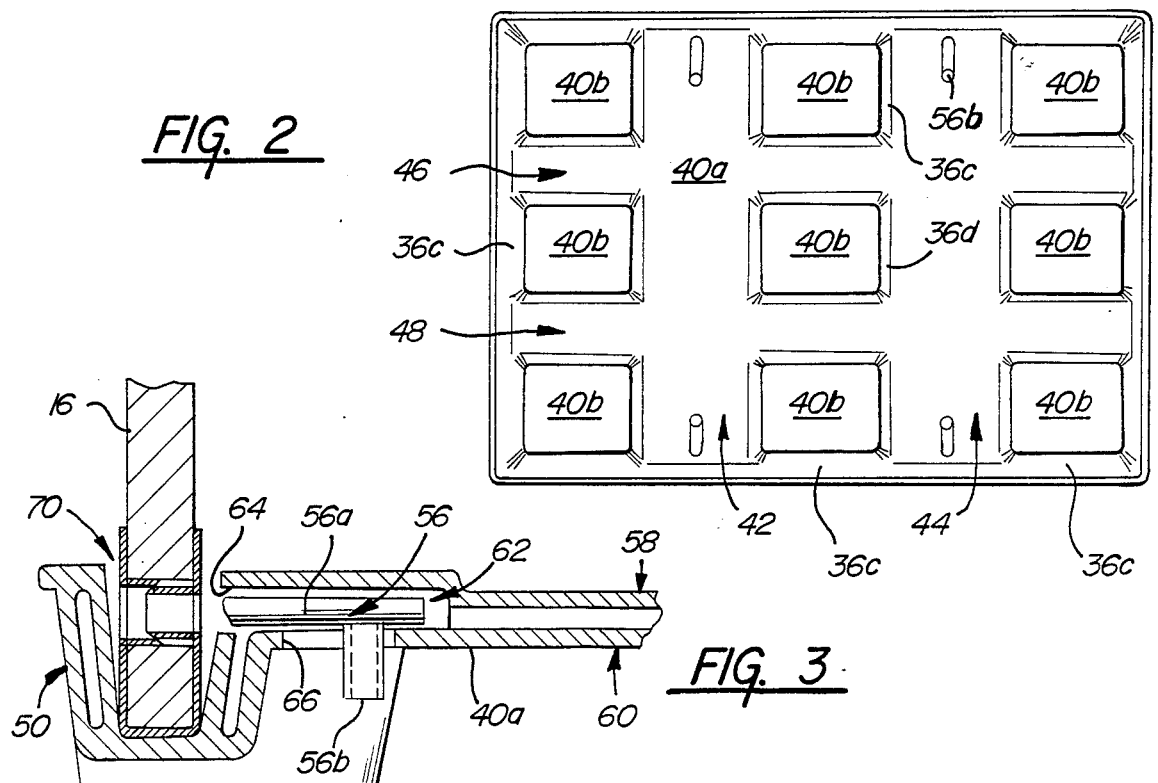
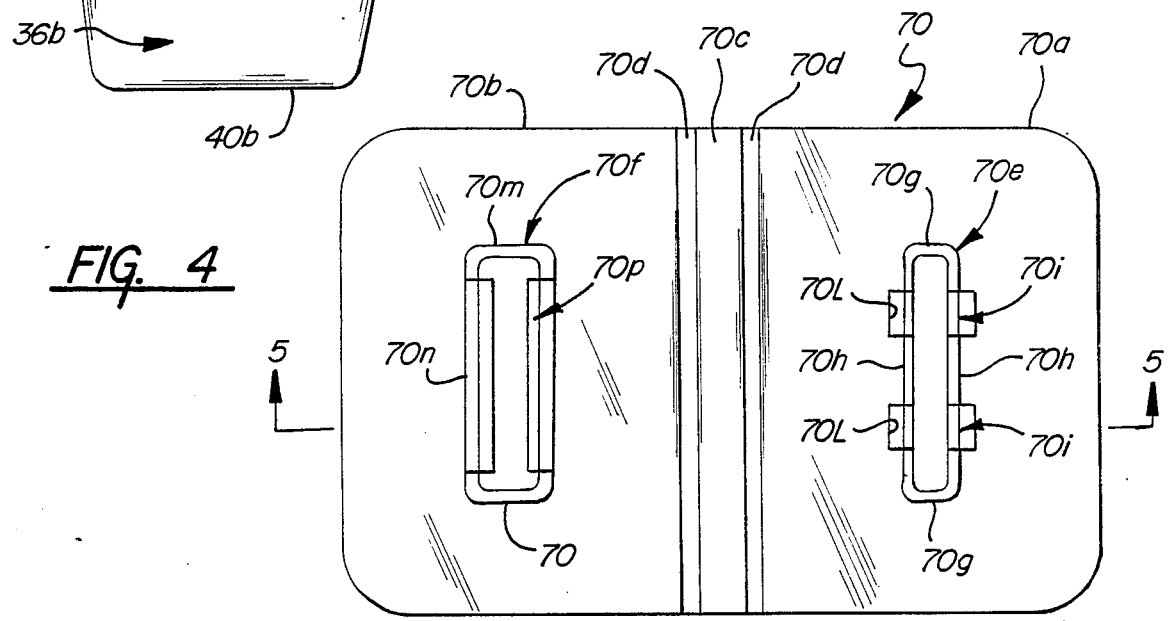
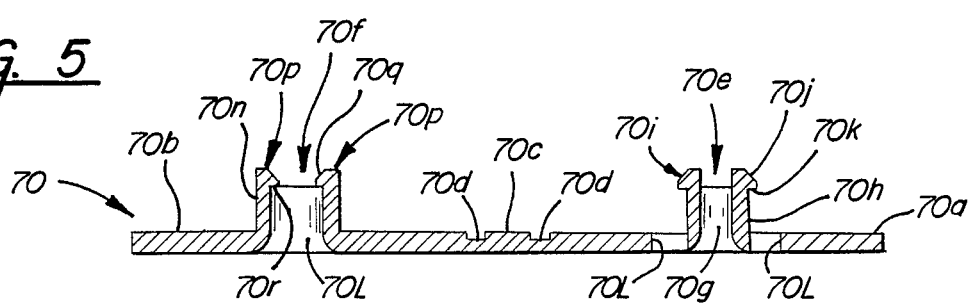

CONTAINER WITH SLEEVE INTERLOCKING LATCH

RELATED APPLICATION

This application is a continuation-in-part of U.S. patent application Ser. No. 080,230, filed on July 28, 1987, now U.S. Pat. No. 4,765,252 which is a continuation of U.S. patent application Ser. No. 858,524, filed on Apr. 23, 1986, now abandoned, which is a continuation of U.S. patent application Ser. No. 642,778, filed on Aug. 21, 1984, now abandoned.

BACKGROUND OF THE INVENTION

This application relates to shipping storage containers and more particularly to containers in which the base of the container serves as a reusable pallet.

Various container designs have been employed to ship and store industrial goods. In many instances the containers are stored in large warehouse facilities where they are moved from one location to another by fork-lift trucks or the like. One commonly used container incorporates a corrugated sleeve which is nailed to a conventional wooden pallet. The sleeve forms the side walls of the container and the pallet serves as its bottom. The use of the wooden pallets, however, have some drawbacks. For example, they are subject to breakage and thus are not reusable over an extended period of time. Wooden pallets also take up a considerable amount of valuable floor space in the warehouse when they are not in use.

In an effort to solve some of the problems with the wooden pallets, reusable plastic pallets have been employed with some degree of success. Such pallets have been combined with a corrugated sleeve to form a container. The plastic pallet and sleeve are reusable and may be compactly stacked when not in use, thereby providing significant advantages over conventional wooden pallets. U.S. Pat. No. 4,254,873 to Cooke III et al. is a representative example of such a composite container design.

These composite container designs also have their drawbacks. The edges of the sleeve merely rest in grooves in the pallet in most of the known designs. Consequently, some additional means must be provided to hold them together prior to shipping. Generally the pallet and corrugated sleeve are banded together by steel bands or cords encircling the components. This banding process introduces an additional expense in both time and money since the container must not only be bound prior to shipping but must also be unbound before the container contents can be removed.

In an effort to eliminate the expense and inconvenience of the banding process, various proposals have been made to facilitate the releasable attachment of the sleeve to the pallet. In one such proposal, as shown for example in applicant's co-pending U.S. patent application Ser. No. 080,230, a plurality of latches are slidably mounted on the pallet at circumferentially spaced locations around the periphery of the pallet for coaction with a plurality of slots provided at circumferentially spaced locations around the periphery of the sleeve adjacent the lower edge of the sleeve. With this arrangement, the sleeve may be releasably secured to the pallet by resting the lower edge of the sleeve on the pallet with the latches withdrawn inwardly and thereafter sliding the latches outwardly and through the corresponding slots in the lower edge portion of the sleeve to releasably secure the sleeve to the pallet. Whereas this sliding latch/slot arrangement has proven to be generally satisfactory, the area in and around the slot in the sleeve, after extended periods of usage, has tended to become damaged with a consequent derogation in the effective operation of the latch mechanism.

SUMMARY OF THE INVENTION

This invention is directed to the provision of an improved container.

More specifically, this invention is directed to the provision of a more durable container of the pallet and sleeve type.

This invention is further directed to the provision of an improved reinforcing structure for a container of the type including an end unit with sliding latches engaging slots in a coacting sleeve.

The invention relates to a container of the type including an end unit assembly including an end unit and a plurality of sliding latch members mounted on the end unit at circumferentially spaced locations around the periphery thereof, and a sleeve including an edge adapted to seat on the end unit and including a plurality of slots adjacent the sleeve edge for locking receipt of the sliding latch members. According to the invention, the container further includes a plurality of reinforcing members for respective coaction with the slots in the sleeve and each including an outer planar portion adapted to be positioned against the outer face of the sleeve adjacent the slot, an inner planar portion adapted to be positioned adjacent the inner face of the sleeve adjacent the slot, liner means adapted to be positioned in the slot, and locking means operative in response to insertion of the liner means into the slot to lock the inner and outer planar portions together with the outer planar portion positioned against the outer face of the sleeve, the inner planar portion positioned against the inner face of the sleeve, and the liner means positioned within the slot. This reinforcing structure enables the ready provision of reinforcing means for each slot in the sleeve so as to preclude damage to the sleeve over sustained periods of usage as the sliding latches on the end unit move into and out of coacting relation with the slots.

According to a further feature of the invention, the liner means of the reinforcing structure includes an inner tubular portion projecting into the slot from the inner planar portion and an outer tubular portion projecting into the slot from the outer planar portion. This arrangement allows the tubular portions to be pushed into the slot from opposite sides so as to coact to provide a liner for the slot.

According to a further feature of the invention, the locking means of the reinforcing structure includes coacting locking means on the inboard ends of the tubular portions. This arrangement allows the inner and outer planar portions of the reinforcing structure to be locked together on opposite sides of the sleeve adjacent the slot by the movement of the tubular portions into the slot from opposite sides of the slot.

According to a further feature of the invention, the coacting locking means includes a lip along the inboard end of the inner tubular portion and a coacting lip along the inboard end of the outer tubular portion. The coacting lips provide a ready and convenient means of providing the desired locking action.

According to a further feature of the invention, the lip on the inner tubular portion includes a leading cam face terminating in a lock face and the lip on the outer tubular portion includes a leading cam face, complemental to the cam face on the inner tubular portion lip, terminating in a lock face. The lips are resilient and flex inwardly and outwardly in response to engagement of the complemental cam faces to allow the lips to pass one another and then snap back inwardly and outwardly to lockingly engage the lock faces.

According to a further feature of the invention, the tubular portions are generally rectangular and include parallel sidewalls and parallel end walls; the lips ar provided on the sidewalls of the inner and outer tubular portions; and the sidewalls of the inner tubular portion are equal in length to the sidewalls of the outer tubular portion while the end walls of the inner tubular portion are shorter than the end walls of the outer tubular portion so that, as the tubular portions are inserted into the slot from opposite sides of the sleeve, the end walls of the inner tubular portion move into abutting engagement with the end walls of the outer tubular portion and the lips on the sidewalls of the inner tubular portion move telescopically within the lips on the sidewalls of the outer tubular portion. This specific tubular portion structure allows the provision of a solid, continuous liner within the slot while simultaneously providing a ready and effective locking means as between the inner and outer tubular portions.

According to a further feature of the invention, the reinforcing structure is formed of a single piece of material with a central wall portion interposed between the inner and outer planar portions and sized to fit along the edge of the sleeve adjacent the corresponding slot and hinge means are provided between the central wall portion and the inner and outer planar portions to allow the central wall portion to be positioned along the edge of the sleeve and allow the inner and outer planar portions to be thereafter pivoted inwardly to insert the tubular portions into the slot and position the inner and outer planar portions respectively against the inner and outer faces of the sleeve.

In the preferred embodiment of the invention, the reinforcing structure is formed of a single piece of plastic material such, for example, as injection molded high density polyethylene.

BRIEF DESCRIPTION OF THE DRAWINGS

FIG. 1 is an exploded view of a container including a sleeve and a base member including sliding latches for releasably securing the sleeve to the base member;

FIG. 2 is a bottom view of the base member of FIG. 1;

FIG. 3 is a cross sectional view taken on line 3—3 of FIG. 1 and further showing a reinforcing structure according to the invention;

FIG. 4 is a plan view of the invention reinforcing structure;

FIG. 5 is a cross-sectional view taken on line 5—5 of FIG. 4;

DETAILED DESCRIPTION OF THE PREFERRED EMBODIMENT

Figure 6:
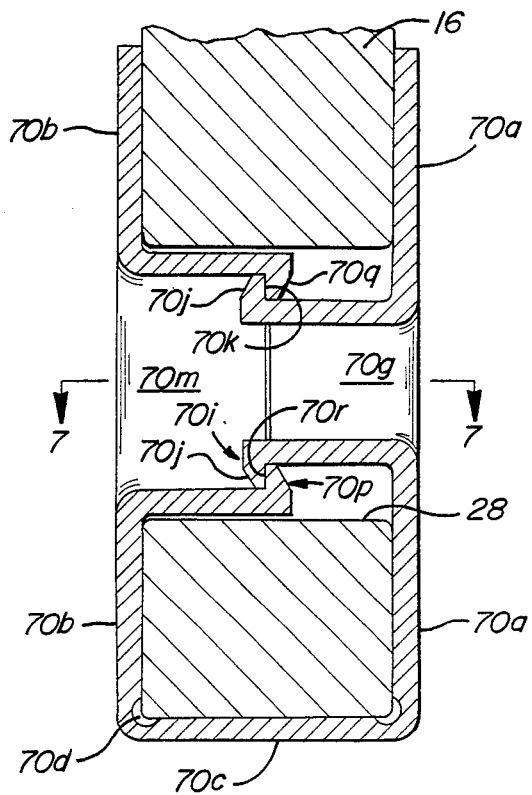
FIG. 6 is a detailed view of the reinforcing structure of the invention shown in coaction with a slot in the container sleeve.
Figure 7:
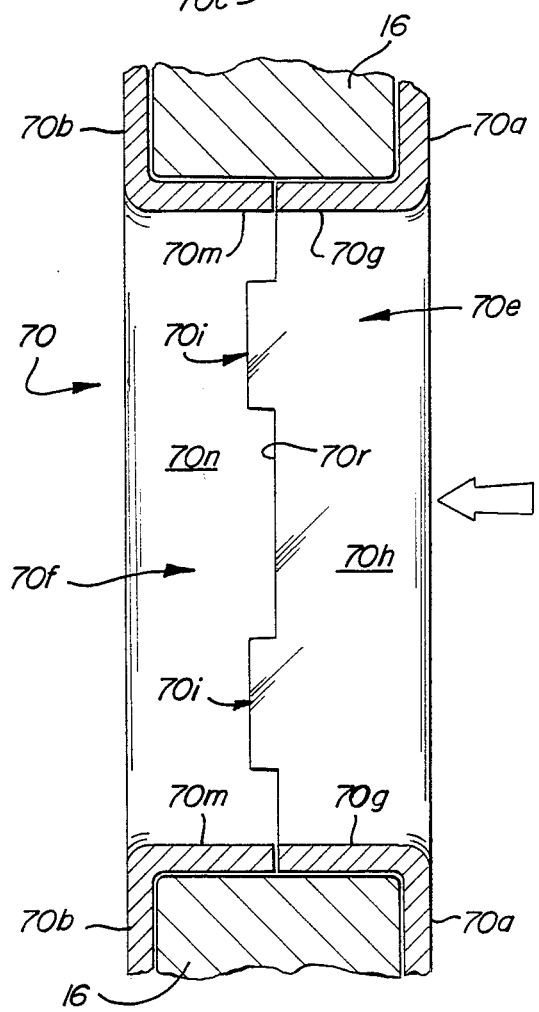
FIG. 7 is a cross-sectional view taken on line 7—7 of FIG. 6.

The container seen generally at 10 in FIG. 1 in exploded form includes a sleeve 12 and an end unit in the form of a base or pallet 14. The container may further include another end unit in the form of a top member (not shown) adapted to be fitted over the top of sleeve 12 and having a construction generally similar to the pallet or base member 14.

Sleeve 12 is in the form of an open ended rectangular box providing side walls 16, 18, 20 and 22 for the container. Sleeve 12 is preferably formed of three-ply panels of corrugated material such as commercially available from Triwall Containers Inc. Corrugated material for sleeve 12 is preferred because it is relatively inexpensive, is easy to form, can be collapsed when not in use, and exhibits comparatively good strength characteristics. However, it should be understood that various other suitable materials may be used for sleeve 12.

A pair of truncated pyramidal cut-outs 24 are defined in the bottom edge 26 of the sleeve along each sidewall of the sleeve so that bottom edge 26 is constituted by corner portions 26a, immediate portions 26b, inset portions 26c, and angled portions 26d. A through slot 28 is provided immediately above and centrally of the bottom edge insert portions 26c in sleeve sidewalls 16 and 20 and similar through slots 30 are provided at circumferentially spaced locations along and below the top edge 32 of sidewalls 16 and 20 of the sleeve for coaction with sliding latch members on the top member (not shown).

Base member 14 is preferably formed in a vacuum forming process and is preferably of a plastic twin sheet construction employing two polyethylene skins which are fused or knitted together at various points to aid in structural rigidity. However, it should be noted that various plastic materials and other formation techniques such as injection molding, rotocasting and the like may be alternately employed.

Base member 14 is generally planar and includes a platform structure 34 and a plurality of hollow legs 36 extending downwardly from platform structure 34 and opening at their upper ends 36a in the upper face 38 of the platform structure. The lower or under face 40 of the base member includes a main body portion 40a constituting the underface of the platform structure 34 and a base member support surface 40b constituted by the lower faces of the bottom walls of the legs 36. Nine legs 36 are provided, including four corner legs 36b, four intermediate legs 36c and a central leg 36d. The legs 36 coact to define a plurality of elongated tunnels or indentations 42, 44, 46 and 48 extending transversely and longitudinally across the underside of the base member. Indentations 42, 44, 46 and 48 provide relieved access areas for receiving the forks of a fork-lift truck or the like. As a consequence, the base member 14 may serve as a pallet for the container 10 which may thus be lifted and moved by conventional warehousing equipment.

The upper face 38 of the base member includes a main body portion 38a interrupted at its center and around its periphery by the leg openings 36a. The base member further includes a peripheral flange 50 extending totally around the base member and coacting with the main body upper surface 38a to define a continuous seating surface extending around the periphery of the base within the flange 50 for receipt of the lower edge 26 of the sleeve 12. The seating surface includes grooves 52 defined over the tunnels or indentation 42-48 and is otherwise defined, adjacent the corners of the base member and adjacent the intermediate sections of the base member, by the upper surfaces of the bottom walls of the legs 36. Specifically, with the sleeve 12 seated on the base member, corner portions 26a and intermediate portions 26b of the lower edge of the sleeve are seated on the upper faces of the bottom walls of the legs 36 and the inset portions 26c of the lower edge of the sleeve are respectively seated in the grooves 52, over the tunnels or indentations 42-48, so as to position each slot 28 within a respective groove 52.

With the sleeve thus seated on the base member, the lower edge portions 26a and 26b of the sleeve are positioned substantially in the plane of the base member lower support surface 40b so that, in the case of a pallet constituting a ground supported pallet for the container the bottom edge of the sleeve terminates substantially at ground level. Thus, compressive forces applied downwardly to the container 10 are transferred by the sleeve 12 substantially to the floor or other supporting surface. As a result, deformation problems associated with the prior art designs are effectively eliminated without a substantial increase in manufacturing costs.

A plurality of latch members 56 are provided on base member 14 at circumferentially spaced locations thereabout. The latch members 56 correspond in number and circumferential position to the slots 28 in sleeve 12 and are each positioned over an indentation or tunnel 42-48 and in association with a groove 52. Latch members 56 are mounted in the base member for sliding movement between a retracted position in which the sleeve lower edge is free to enter or leave grooves 52 and an extended or locking position in which the tips of the latch members are lockingly engaged with the sleeve slots 28 to lockably but releasable secure the sleeve to the base unit.

Latch members 56 are preferably formed of the same plastic material as the base member 14 and each include a main body portion 56a, in the form of an elongated plate, and an annular handle or actuator portion 56b formed integrally with the main body portion 56a adjacent one end thereof. Latch members 56 are slidably positioned between the inner and outer skins 58 and 60 of the platform structure. Specifically, the inner and outer skins are configured to define slideways 62 extending perpendicularly inwardly from grooves 52 and opening at their outboard ends 64 in grooves 52. Each latch member 56 is positioned in a slideway 62 with latch handle portion 56b extending downwardly into the space provided beneath the base member by the associated tunnel or indentation, and is mounted for sliding movement in a slot 66 provided in the lower skin of the base member to allow the inward and outward sliding movement of the latch members. Slots 66 desirably provide a detenting action for the latch members so as to provide a positive retracted or released position for the latch members and a positive extended or latching position for the latch members. Further details of a latch assembly construction suitable for use in the container of the invention are disclosed in applicant's copending U.S. patent application Ser. No. 080,230.

In accordance with the invention, a plurality of reinforcing structures 70 are provided for respective coaction with each of the slots 28 and 30 so a to reinforce the slot and preclude damage to the slot, and to the corrugated material of the sleeve surrounding the slot, over extended periods of usage of the slot in coaction with the associated latch member.

Each reinforcing structure 70 is formed as a single piece of plastic material, such for example as injection molded, high density polyethylene. Each reinforcing structure 70 includes an inner generally planar portion 70a; an outer generally planar portion 70b; a central wall portion 70c connected to inner and outer portions 70a, 70b by hinge portions 70d; an inner tubular portion 70e; and an outer tubular portion 70f.

Reinforcing structure 70 is sized and configured such that when the central wall portion 70c is positioned under and along the lower edge 26c of a sleeve side wall beneath a slot 28 and the inner and outer planar portions 70a and 70b are pivoted upwardly and inwardly about the hinge axes 70d, the tubular portions 70e and 70f enter the slot 28 from opposite sides so as to provide a liner for the slot and provide a plastic encasement for the area above, along side of, and below the slot on both the inner and outer faces of the sleeve wall.

Inner tubular portion 70e projects upwardly or inwardly from the plane of planar portion 70a and has a generally rectangular configuration defined by end walls 70g and sidewalls 70h. A pair of lips 70i are provided along each sidewall 70h. Each lip 70i extends outwardly from the related sidewall 70h and includes an angled cam face 70j terminating in a lock face 70k. Openings 70l are provided in planar portion 70a proximate each lip 70i to facilitate the injection molding process and to provide greater flexibility for the sidewalls adjacent the lips 70i.

Outer tubular portion 70f has a generally rectangular configuration defined by end walls 70m and sidewalls 70n. A single inwardly extending lip 70p is defined along each sidewall 70n. Each lip 70p includes an angled cam face 70q terminating in a lock face 70r. The sidewalls 70n of tubular portion 70f are equal in length to the sidewalls 70h of tubular portion 70e but the end walls 70m of tubular portion 70f are longer than the end walls 70g of tubular portion 70e.

In the use of the invention reinforcing structure in association with a slot 28, and as previously described, the central wall portion 70c of the reinforcing structure is positioned below and along an inset edge 26c below a slot 28, whereafter the inner and outer planar portions 70a and 70b are pivoted upwardly and inwardly about the hinge axes defined by the hinge portions 70d so that the tubular portions 70e and 70f enter the slot 28 respectively from the inside and the outside of the sleeve as the planar portions 70a and 70b move into a protective position positioned against the inner and outer faces of the sleeve wall adjacent the slot 28.

As the tubular portions 70e and 70f enter the slot 28 from opposite sides of the slot, the upper or leading edges of the end walls 70g on the tubular portion 70e and the end walls 70l on tubular portion 70f move into abutting engagement so as to define smooth end walls therebetween extending from the inside to the outside of the sleeve wall, and the lips 70i on the tubular member 70e move telescopically within the lips 70m on the tubular member 70f and lockingly coact with the lips 70p to lockingly secure the reinforcing structure to the sleeve wall. Specifically, as the tubular member 70e and 70f converge toward each other from opposite sides of the slot 28, the cam faces 70j on the lips 70i of the inner tubular portion cammingly coact with the cam faces 70q on the lip portions 70p of the outer tubular portion and the lips flex respectively outwardly and inwardly so as to allow the lips to move past each other and then snap back inwardly and outwardly to allow the lock faces 70k and 70r to move into abutting, interlocking relationship to firmly lock the reinforcing structure to the sleeve.

In its mounted, locked position, the reinforcing structure provides a liner within the slot 28 for receipt of the latch 56 so a to preclude damage to the slot as the latch 56 moves into and out of the over repeated cycles of operation of the container; the planar portion 70b protects the area of the sleeve on the outside of the sleeve adjacent the slot; the planar portion 70a protects the inner surface of the sleeve surrounding the slot; and the central wall portion 70c protects the edge 26c of the sleeve beneath the slot. The hard plastic material of the reinforcing structure of the invention thus presents a hard, long wearing plastic surface at all of the areas of wear adjacent the slot 28 so that the sleeve may be attached to and released from the associated base member by the use of the latch assemblies and coacting slots over extended cycles of operation without significant damage to the slots 28 or to the corrugated material of the sleeve adjacent the slots. The reinforcing structures may be attached to the sleeves quickly and effectively by simply placing the central wall portion 70c along and below an inset edge 26c on the sleeve and swinging the planar portions 70a and 70b upwardly to move the tubular portions 70e and 70f into the slot and lockingly secure the reinforcing structure to the sleeve by the locking interaction of the lips on the tubular portions of the reinforcing structure providing the liner for the slot in the sleeve. The locking structure is effective to maintain the reinforcing structure in position relative to the sleeve even under heavy-duty, abusive work environments and yet the reinforcing structures may be readily released from the sleeve, either for replacement of the reinforcing structure or for use of the reinforcing structure on another sleeve, simply by prying outwardly on the planar portions 70a and 70b.

Reinforcing structures 70 are also provided for coaction with slots 30 adjacent the upper edge of the sleeve to provide protection for the sleeve as the latch members on the top member (not shown) move into and out of the slots 30 to releasably secure the top member to the sleeve. As will be obvious, when reinforcing structures 70 are used in association with slots 30, the central wall portion 70c is placed over and along the top edge of the sleeve above the slot 30 and the planar portions 70a and 70b are pivoted downwardly to move tubular portions 70e and 70f into the slot.

The invention reinforcing structure will thus be seen to provide an inexpensive and efficient means of protecting the high wear area of the sleeve around the slots so as to enable the sleeve to be utilized over extended periods of operation.

Whereas a preferred embodiment of the invention has been illustrated and described in detail it will be apparent that various changes may be made in the disclosed embodiment without departing from the scope or spirit of the invention.

What is claimed:

1. A container comprising:
   (A) an end unit assembly including an end unit and a plurality of sliding latch members mounted on said end unit in circumferentially spaced locations around the periphery thereof;
   (B) a sleeve including an edge seating on said end unit and including a plurality of slots adjacent said edge for locking receipt of said latch members;
   (C) a plurality of reinforcing structures for respective coaction with said slots, each reinforcing structure including an outer planar portion positioned against the outer face of said sleeve adjacent its respective slot, an inner planar portion positioned adjacent the inner face of said sleeve adjacent said slot, liner means positioned in said slot and lining edges of said slot to define a passage extending between said outer face of said sleeve and said inner face of said sleeve for through passage of said latch members, and locking means operative in response to insertion of said liner means into said slot to lock said inner and outer planar portions together with said outer planar portion positioned against the outer face of said sleeve and said inner planar portion positioned against said inner face of said sleeve.

2. A container according to claim 1 wherein:
   (D) said liner means of each reinforcing structure includes an inner tubular portion projecting into said slot from said inner planar portion and an outer tubular portion projecting into said slot from said outer planar portion.

3. A container according to claim 2 wherein said tubular portions each define a free inboard end and wherein:
   (E) said locking means includes coacting locking means on the inboard ends of said tubular portions operative to lock the inboard ends of said tubular portions together in response to insertion of said tubular portions into said slot.

4. A container according to claim 3 wherein:
   (F) said coacting locking means includes a lip on the inboard end of said inner tubular portion and a coacting lip on the inboard end of said outer tubular portion.

5. A container according to claim 4 wherein:
   (G) said lip on said inner tubular portion includes a leading cam face terminating in a lock face; and
   (H) said lip on said outer tubular portion includes a leading cam face, complemental to said cam face on said inner tubular portion lip, and terminating in a lock face.

6. A container according to claim 5 wherein:
   (I) said lips are resilient and flex inwardly and outwardly in response to engagement of said complemental cam faces to allow said lips to pass one another and then snap back inwardly and outwardly to lockingly engage said lock faces.

7. A container according to claim 6 wherein:
   (J) said tubular portions are generally rectangular and include parallel sidewalls and parallel end walls;
   (K) said lips are provided on said sidewalls of said inner and outer tubular portions; and
   (L) said sidewalls of said inner tubular member are equal in length to said sidewalls of said outer tubular member and said end walls of said inner tubular portion are shorter than end walls of said outer tubular portion so that, as said tubular portions are inserted into said slot, said end walls of said inner tubular member move into abutting engagement with said end walls of said outer tubular member and said lips on said sidewalls of said inner tubular member move telescopically within said lips on said sidewalls of said outer tubular member.

8. A container according to claim 2 wherein:
   (E) each reinforcing structure is formed of a single piece of material with a central wall portion interposed between said inner and outer planar portions and sized to fit along said edge of said sleeve adjacent the corresponding slot; and (F) hinge means are provided between said central wall portion and said inner and outer planar portions to allow said central wall to be positioned along said edge of said sleeve adjacent the slot and said inner and outer planar portions to be pivoted inwardly to insert said tubular portions into said slot and position said inner and outer planar portions respectively against the inner and outer faces of said sleeve.

9. A container comprising:
(A) a base assembly including a base member and a plurality of sliding latch members mounted on said base member at circumferentially spaced locations around the periphery thereof;
(B) a sleeve including a lower edge seated on said base member and including a plurality of slots adjacent its lower edge for locking receipt of said latch members; and
(C) a plurality of reinforcing structures for respective coaction with said slots, each reinforcing structure including coacting portions entering its respective slot from opposite sides thereof and means operative in response to entry of said coacting portions into said slot to lockingly secure said coacting portions together.

10. A container according to claim 9 wherein:
(D) said coacting portions of each reinforcing structure coact telescopically as they enter said slot from said opposite sides thereof.

11. A sleeve assembly for use with an end unit to form a container, said sleeve assembly comprising:
(A) a sleeve including an edge adapted to seat on the end unit and including a plurality of slots adjacent aid edge for locking receipt of latch members carried by the end unit; and
(B) a plurality of reinforcing structures for respective coaction with said slot, each reinforcing structure including an outer planar portion positioned against the outer face of said sleeve adjacent said slot, an inner planar portion positioned against the inner face of said sleeve adjacent said slot, liner means positioned in said slot and lining edges of said slot to define a passage extending through said slot, and locking means operative in response to insertion of said liner means into said slot to lock said inner and outer planar portions together with said outer planar portion positioned against the outer face of said sleeve and said inner planar portion positioned against said inner face of said sleeve;
(C) said liner means of each reinforcing structure including an inner tubular portion projecting into said slot from said inner planar portion and an outer tubular portion projecting into said slot from said outer planar portion;
(D) said tubular portions each defining a free inboard end and said locking means including coacting locking means on the inboard ends of said tubular portions operative to lock the inboard ends of said tubular portions together in response to insertion of said tubular portions into said slot.

12. A sleeve assembly according to claim 11 wherein:
(E) said coacting locking means includes a lip on the inboard end of said inner tubular portion and a coacting lip on the inboard end of said outer tubular portion.

13. A sleeve assembly according to claim 12 wherein:

(F) said lip on said inner tubular portion includes a leading cam face terminating in a lock face; and
(G) said lip on said outer tubular portion includes a leading cam face, complemental to said cam face on said inner tubular portion lip, terminating in a lock face.

14. A sleeve assembly according to claim 13 wherein:
(H) said lips are resilient and flex inwardly and outwardly in response to engagement of said complemental cam faces to allow said lips to pass one another and then snap back inwardly and outwardly to lockingly engage said lock faces.

15. A sleeve assembly according to claim 14 wherein:
(I) said tubular portions are generally rectangular and include parallel sidewalls and parallel end walls;
(J) said lips are provided on said sidewall of said inner and said outer tubular portions; and
(K) said sidewalls of said inner tubular portion are equal in length to said sidewalls of said outer tubular portion and said end walls of said inner tubular portion are shorter than said end walls of said outer tubular portion so that, as said tubular portions are inserted into said slot, said end walls of said inner tubular portion move into abutting engagement with said end walls of said outer tubular portion and said lips on said sidewalls of said inner tubular portion move telescopically within said lips on said sidewalls of said outer tubular portion.

16. A reinforcing structure for use with a sleeve having at least one slot positioned adjacent an edge of the sleeve, said reinforcing structure comprising:
(A) an outer planar portion adapted to be positioned against the outer face of the sleeve adjacent the slot;
(B) an inner planar portion adapted to be positioned adjacent the inner face of the sleeve adjacent the slot;
(C) liner means including an inner tubular portion adapted to project into the slot from said inner planar portion and an outer tubular portion adapted to project into the slot from said outer planar portion, said tubular portions each defining an inboard free end; and
(D) coacting locking means on the inboard free ends of said tubular portions operative in response to insertion of said tubular portions into the slot to lock said inner and outer planar portions together with said outer planar positioned against the outer face of the sleeve, said inner planar portion positioned against the inner face of the sleeve, and said tubular portions positioned within the slot.

17. A reinforcing structure according to claim 16 wherein:
(G) said coacting locking means includes a lip on the inboard end of said inner tubular portion and a coacting lip on the inboard end of said outer tubular portion.

18. A reinforcing structure according to claim 17 wherein:
(H) said lip on said inner tubular portion includes a leading cam face terminating in a lock face; and
(I) said lip on said outer tubular portion includes a leading cam face, complemental to said cam face on said inner tubular portion lip, terminating in a lock face.

19. A reinforcing structure according to claim 17 wherein:

(J) said lips are resilient and flex inwardly and outwardly in response to engagement of said complemental cam faces to allow said lips to pass one another and then snap back inwardly and outwardly to lockingly engage said lock faces.

20. A reinforcing structure according to claim 19 wherein:
(K) said tubular portions are generally rectangular and include parallel sidewalls and parallel end walls;
(L) said lips are provided on said sidewalls of said inner and outer tubular portions; and
(M) said sidewalls of said inner tubular portion are equal in length to said sidewalls of said outer tubular portion and said end walls of said inner tubular portion are shorter than said end walls of said outer tubular portion so that, as said tubular portions are inserted into the slot, said end walls of said inner tubular portion move into abutting engagement with said end walls of said outer tubular portion and said lips on said sidewalls of said inner tubular portion move telescopically within said lips on said sidewalls of said outer tubular portion.

21. A sleeve assembly for use with an end unit to form a container, said sleeve assembly comprising:
(A) a sleeve including an edge adapted to seat on the end unit and including a plurality of slots adjacent said edge for locking receipt of latch members carried by the end unit;
(B) a plurality of reinforcing structures for respective coaction with said slots, each reinforcing structure including an outer planar portion positioned against the outer face of said sleeve adjacent its respective slot, an inner planar portion positioned adjacent the inner face of said sleeve adjacent said slot, liner means positioned in said slot to line edges of said slot and defining a through passage extending through said slot from the outer face of said sleeve to the inner face of said sleeve for passage of a latch member carried by said end unit, said liner means including an inner tubular portion projecting into said slot from said inner planar portion and an outer tubular portion projecting into said slot from said outer planar portion, and locking means operative in response to insertion of said tubular portions into said slot to lock said inner and outer planar portions together with said outer planar portion positioned against the outer face of said sleeve and said inner planar portion positioned against said inner face of said sleeve.

22. A sleeve assembly according to claim 21 wherein:
(C) each reinforcing structure is formed of a single piece of material with a central wall portion interposed between said inner and outer planar portions and sized to fit along said edge of said sleeve adjacent the corresponding slot; and
(E) hinge means are provided between central wall portion and said inner and outer planar portions to allow said central wall portion to be positioned along said edge of said sleeve and said inner and said outer planar portions to be pivoted inwardly to insert said tubular portions into said slot and position said inner and outer planar portions respectively against said inner and outer faces of said sleeve.

23. A sleeve assembly according to claim 22 wherein:
(F) each reinforcing structure is formed of a single piece of plastic material.

24. A sleeve assembly according to claim 23 wherein:
(G) said sleeve is formed of a corrugated cardboard material.

25. A reinforcing structure for use with a sleeve having at least one slot positioned adjacent an edge of the sleeve, said sleeve being intended for releasable securement to an end unit to form a container by the use of a latch member carried by the end unit and passing through the slot, said reinforcing structure comprising:
(A) an outer planar portion adapted to be positioned against the outer face of the sleeve adjacent the slot;
(B) an inner planar portion adapted to be positioned against the outer face of the sleeve adjacent the slot;
(C) liner means adapted to be positioned in the slot to line edges of the slot and define a through passage extending through the slot from the inner face of the sleeve to the outer face of the sleeve for through passage of the latch member; and
(D) locking means operative in response to insertion of said liner means into the slot to lock said inner and outer planar portions together with said outer planar portion positioned against the outer face of the sleeve, said inner planar portion positioned against the inner face of the sleeve, and said liner means positioned within the slot and defining a through passage extending through the slot for through passage of the latch member;
(E) said liner means including an inner tubular portion adapted to project into the slot from said inner planar portion and an outer tubular portion adapted to project into the slot from the outer planar portion.

26. A reinforcing structure according to claim 25 wherein:
(F) said reinforcing structure is formed of a single piece of material with a central wall portion interposed between said inner and outer planar portions and sized to fit along the edge of the sleeve adjacent the slot; and
(G) hinge means are provided between said central wall portion and said inner and outer planar portions to allow said central wall portion to be positioned along the edge of the sleeve and said inner and outer planar portions to be pivoted inwardly to insert the tubular portions into the slot and position said inner and outer planar portions respectively against the inner and outer faces of the sleeve.

27. A reinforcing structure according to claim 26 wherein:
(H) said reinforcing structure is formed as a single piece of plastic material.

* * * * *